United States Patent [19]

Lübbers et al.

[11] E Re. 30,317

[45] Reissued Jul. 1, 1980

[54] METHOD AND APPARATUS FOR DETERMINING THE PERFUSION EFFICIENCY FACTOR OF ANIMAL TISSUE

[75] Inventors: Dietrich W. Lübbers, Dortmund; Albert Hüch, Marbach, both of Fed. Rep. of Germany

[73] Assignee: Hellige GmbH, Freiburg im Breisgau, Fed. Rep. of Germany

[21] Appl. No.: 850,770

[22] Filed: Nov. 11, 1977

Related U.S. Patent Documents

Reissue of:

[64] Patent No.: 3,918,434
Issued: Nov. 11, 1975
Appl. No.: 415,803
Filed: Nov. 14, 1973

[30] Foreign Application Priority Data

Nov. 15, 1972 [DE] Fed. Rep. of Germany ..... 2255879

[51] Int. Cl.[2] ..... A61B 5/02; A61B 6/00

[52] U.S. Cl. ..... 128/635; 128/654; 128/659; 128/691

[58] Field of Search ..... 128/2 E, 2 G, 2 L, 2 R, 128/2 A, 2.1 E, 2.05 V, 635, 654, 659, 691

[56] References Cited

U.S. PATENT DOCUMENTS

| | | | |
|---|---|---|---|
| 3,357,910 | 12/1967 | Shiller | 128/2.1 E |
| 3,659,586 | 5/1972 | Johns et al. | 128/2 E |
| 3,664,178 | 5/1972 | Spergel et al. | 128/2 E |
| 3,769,961 | 11/1973 | Fatt et al. | 128/2.1 E |
| 3,795,239 | 3/1974 | Eberhard et al. | 128/2 E |

FOREIGN PATENT DOCUMENTS 1087752 8/1960 Fed. Rep. of Germany .

OTHER PUBLICATIONS

Cooper, R., *Med. Electron. Biol. Engng.*, vol. 1, pp. 529–536, 1963.

Silver, I. A., *Meas. of Oxygen Tension in Tissues*, pp. 135–153.

Naylor, P. F. D. et al., *Br. J. Derm.* (1968), vol. 80, pp. 606–610 & pp. 643–651.

van de Staak, W. J. B. M., *Dermatologica*, vol. 132, (1966), pp. 199–205.

*Primary Examiner*—Kyle L. Howell

*Attorney, Agent, or Firm*—Walter R. Thiel; Norman E. Brunell; Alfred B. Levine

[57] ABSTRACT

The perfusion rate in animal tissue is measured percutaneously at a specific locus, and at the same time the indicator concentration is percutaneously measured at the same locus so that the perfusion efficiency factor can be determined. Apparatus for carrying out the above method is also disclosed comprising, in combination, a first and a second wall means defining a first and a second surface, each placed in contact with animal tissue to be measured and respectively cooperating with first and second sensor means so that the temperatures of said surfaces can be compared and simultaneously processed with the measurement of the indicator concentration performed by a separate measuring means also in contact with the tissue, so that the perfusion efficiency factor can be determined.

17 Claims, 7 Drawing Figures

METHOD AND APPARATUS FOR DETERMINING THE PERFUSION EFFICIENCY FACTOR OF ANIMAL TISSUE

Matter enclosed in heavy brackets [ ] appears in the original patent but forms no part of this reissue specification; matter printed in italics indicates the additions made by reissue.

BACKGROUND OF THE INVENTION

The present invention relates generally to determining the perfusion efficiency factor of animal tissue, and more particularly to a method and an apparatus for percutaneously determining this factor.

The term "perfusion efficiency factor" as used in the present disclosure is intended to designate a physiological value which is determined by the degree or rate of perfusion (in the case of organs the blood circulation in ml/unit weight/time) and the local concentration of the substance supplied to a given locus by the perfusion (herein called the indicator concentration). A high efficiency of perfusion is obtained if the indicator substance is so distributed in the organ by a perfusion which should be as low as possible, that its concentration corresponds to the existing physiological requirements.

It is already known to determine the blood circulation of an organ at the surface thereof by measuring the thermal conductivity at the surface of the organ. This thermal conductivity depends upon the thermal conductivity of the tissue and the flow of blood through it, that is upon the rate of perfusion. The prior art has proposed either measuring the temperature difference between two thermal sensors of which one is heated at a constant temperature, or providing two measuring surfaces between which a constant temperature differential is produced and the amount of heat required for maintaining the temperature differential is then measured. This latter approach utilizes an annular diathermically heated surface, and a second measuring surface which is located at the center of the space surrounded by this first surface. It is also known to use other approaches, for instance to measure the $H_2$ clearance, or by measuring the radioactive clearance.

However, the perfusion efficiency factor cannot be determined with these prior art approaches, because the results which are derived with them are not correlated with the indicator concentration.

Measurement of the indicator concentration at any particular locus in a percutaneous manner is also known from the prior art. Thus, oxymetric measurements of the $HbO_2$ saturation in the capillary area of the skin have been proposed. Another approach utilizes a measurement of the radioactivity of natural or radioactively identified test substances, for instance radioactively identified glucose. Still another approach measures blood gases which can diffuse through the skin or the organ surface to an electrode arrangement, for instance $O_2$ and $CO_2$.

These measurements, also, cannot indicate the perfusion efficiency factor because they are directed only to the local indicator concentration, and are not correlated with the rate of perfusion.

SUMMARY OF THE INVENTION

Accordingly, it is an object of the present invention to overcome the drawbacks inherent in the prior art.

More particularly, it is an object of the present invention to provide a novel method of percutaneously measuring the perfusion efficiency factor of animal tissue, and to provide an apparatus for carrying out the method.

In keeping with these objects, and with others which will become apparent hereafter, one feature of the invention resides in a method of determining the perfusion efficiency factor of animal tissue, which comprises percutaneously measuring the perfusion rate in animal tissue at a specific locus, and at the same time percutaneously measuring the indicator concentration at the same locus.

The present invention has the advantage that the two essential variables of local tissue supply are simultaneously measured, thus affording the physician and scientist a clear picture of local metabolic conditions.

The apparatus for carrying out the novel method uses a first temperature measuring surface which can be maintained at a controlled temperature and which surrounds a second substantially centrally located temperature measuring surface, and an indicator concentration measuring device. A particularly important indicator for the local metabolic activity is oxygen and its pressure which is transported by the blood flowing through a tissue, the blood oxygen pressure known as "blood-$PO_2$". Percutaneous measuring of blood-$PO_2$ is already known; however, the methods known heretofore for this purpose have the disadvantage that the skin-breathing effect is included in the measurements in a manner which is not controllable and which renders the measurements unreliable. For this reason it has been proposed to so increase local blood circulation by applying maximum hyperthermia that the percutaneous $PO_2$ approaches as much as is possible the arterial $PO_2$. This technique has been disclosed in German allowed application 2,145,400.

Hyperthermia normally causes a maximum enlargement of the blood vessels, so that the perfusion quantity is essentially determined by the blood pressure. However, experience has shown that—particularly in pathological cases—hyperthermia does not necessarily produce the desired maximum hyperemia. This means that a reduced percutaneous $PO_2$ can occur even in the case of dilated blood vessels, as a result of a reduced $O_2$ entrance in the lung, as well as due to a reduced blood circulation.

To take this problem into account the present invention further proposes that subsequently to measuring the perfusion efficiency factor the blood circulation be locally interrupted, and the breathing of the skin be determined by measuring the $PO_2$ pressure drop per unit of time (i.e. the value of $d\,PO_2/dt$). This proposal has the advantage of eliminating the important potential source of the abovementioned errors in measuring the perfusion efficiency factor.

To make this type of measurement possible, the invention proposes to include as part of an apparatus an inflatable pressure-exerting cuff which permits the localized interruption of blood circulation. This makes it possible to carry out the three measurements to be taken according to the invention, namely the measurement of the perfusion rate, the measurement of the indicator concentration, and the measurement of the skin breathing, with a single arrangement and without having to change the measuring conditions, at least on those parts of the body—for instance the extremities such as the arms and the legs—where the cuff can be employed.

The invention also proposes to provide as part of the apparatus an arrangement for making the temperature of the temperature measuring surfaces variable, so that it can be raised beyond the skin temperature. This has the advantage that the non-linear behaviour of skin breathing, and the dependency of the skin $PO_2$ upon the temperature, can be taken into account in the measurements.

Still another proposal according to the present invention visualizes a first measuring surface on a component which is constructed as a counter electrode for platinum electrodes, and a concentration measuring device which is constructed as a multiple-wire platinum electrode. The electrode surfaces are in contact with an electrolyte and are covered by a gas-permeable membrane which is common to them. The arrangement of such platinum electrodes, a counter electrode, electrolytes and a gas-permeable membrane is disclosed in a related application which was filed by us under U.S. Ser. No. 414,538 [and is currently copending], *now abandoned.*

The advantage of this arrangement if that it can be of light weight which eliminates the danger that the capillaries in the tissue might be squeezed shut and that the rate of perfusion might thus be unintentionally changed.

Since it is an important requirement that the physiological conditions be changed as little as possible as a result of and during the measurements, the contact between the arrangement and the tissue being investigated, particularly the contact pressure between them, is of considerable importance. If the contact pressure is too low, and the heat exchange is poor and, in the event that blood gases are used as the indicator, the leakage rate to the ambient atmosphere is so high that the indicator measurements is not reliable. This means that the measurements obtained cannot be used. If, on the other hand, the contact pressure is too great, then the capillary vessels will be squeezed shut and the perfusion rate will be varied in a manner which is neither controllable nor determinable.

To overcome these possibilities the present invention provides that the first measuring surface may be annular and provided with an annular groove which is open at the surface that is to be placed against the tissue to be measured, and which can be connected with a vacuum pump. This has the advantage that the skin opposite the groove is sealingly drawn partly into the same by the suction thus existing in the groove. The contact pressure can readily be adjusted by selecting an appropriate width of the groove or by inserting supporting rings into the same. This type of arrangement is for instance suitable to carry out measurements under labor during child birth.

It is also possible to provide an adhesive layer on the arrangement, by means of which it can be readily and releasably secured to the tissue to be measured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
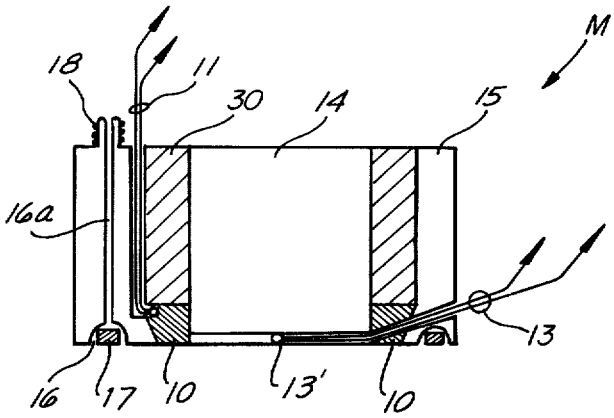
FIG. 1 is a diagrammatic illustration of one embodiment of the invention, partly in section.

Referring now firstly to the embodiment of FIG. 1 it should be understood that this is intended for measuring the perfusion efficiency factor in cases where the indicator carried by the blood of the tissue being measured is of a radioactive nature. This might, for instance, be glucose which is provided with radioactive trace elements and has been injected into the blood stream.

Figure 2:
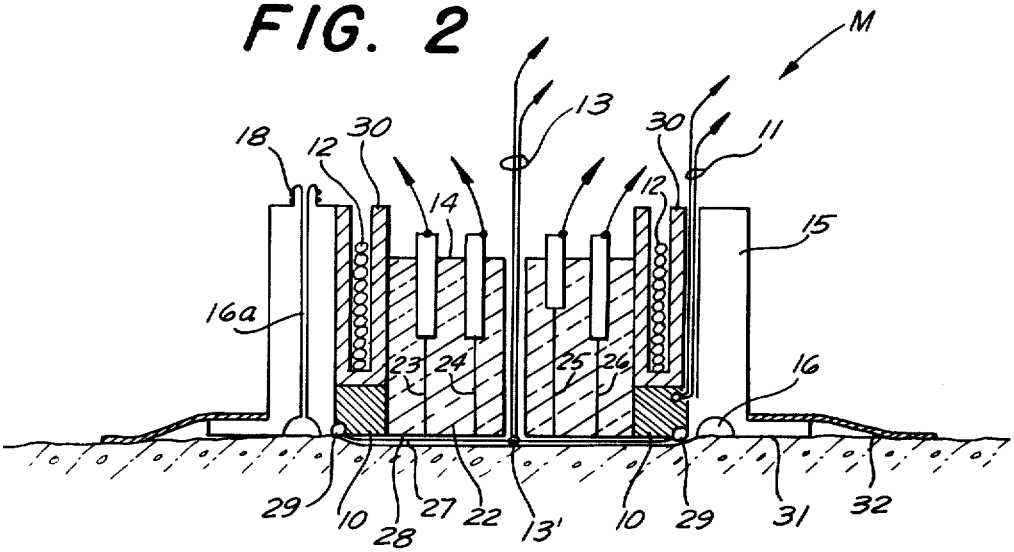
FIG. 2 is a view similar to FIG. 1, illustrating a further embodiment of the invention.

Reference numeral 10 identifies an annular measuring surface of an annular member of a material having good thermal conductivity. The surface 10 is to be placed against a tissue or skin to be measured. The temperature of the surface 10 is measured by a thermal sensor 11 and can be varied by heating means, for example, a heating device 12, such as electrical resistance wire 12 or the like, as shown in FIG. 2, which is mounted on ring support member 30. A second measuring surface 13 in FIG. 1 is provided by a thermal sensor 13 which is located substantially at the center of the annulus formed by the surface 10 and which serves to measure the temperature of the tissue itself. Arranged centrically above the surface 13' of the thermal sensor 13 is a measuring unit 14 which measures the indicator concentration, for instance a counter tube that serves to measure the concentrate of a radioactively marked metabolically active substance (i.e., radioactively marked glucose) which is transported by perfusion through the tissue. The entire arrangement is accomodated in the housing 15 a surface of which faces in the same direction as the surface 10 and is provided with an annular groove 16 which is connected via a passage 16a with a nipple 18, by means of which it can be connected with a vacuum pump (not shown). Supporting rings 17 (one shown) of different width and height can be inserted into the groove 16, to permit an accommodation of the arrangement to the tissue to be measured, when the arrangement is placed against the tissue with which it forms a seal due to the suction effect existing in the groove 16.

The embodiment in FIG. 2 is intended for measurements where indicators are used which can be polarographically determined. In this embodiment, wherein like elements have the same reference numerals as in FIG. 1, a unit M is shown having again the surface 10 and having a heating device 12. A ring support member 30 is provided in which the heating device 12 is mounted and which is connected with the annular member having the surface 10 in such a manner that good thermal conductivity exists between them. Located within the confines surrounded by the annular member having the surface 10 is a Clark multiple-wire electrode of the type mentioned above in the copending application 414,538. Since the filing date of this copending application is Nov. 9, 1973 which antedates the filing date of the present application, the entire specification of this copending reference is herewith incorporated in this disclosure. It serves to measure the local oxygen pressure and has electrode wires 23, 24, 25 and 26 which are of platinum and have a diameter of approximately 15 micron. The wires 23–26 are melted into a glass body 22 in which also the thermal sensor 13 is secured. The member having the surface 10 serves as a counter electrode, being of silver with a chlorided surface. The entire arrangement is in contact with an electrolyte which may, for instance, be stored in 28, such as, the foil sold under the trademark Cuprophane an especially thin cellophane type foil, and is surrounded by gaspermeable membrane 27, for instance the product sold under the trademark Teflon having a thickness of approximately 10 micron, and with sealing means 29.

The electrodes 23, 24 and 26 have small time constants and are advantageously located on the corners of an approximately equi-lateral triangle, the electrode 25, which serves as a calibrating electrode and has a high time constant for this reason, is located near the middle of the triangle, where the thermal sensor 13 is also located. It should be understood that two-wire electrodes, or electrodes wherein the individual electrode wires are arranged in a different manner than described, can also be used.

A surface 31 is to be placed against the diagrammatically illustrated tissue, and annular adhesive strips 32 may be provided on the flange formed with the surface 31 to secure the device temporarily to the tissue. The adhesive members 32 can be constructed as ring members which are adhesively coated on one side, or they can be ring members which are adhesively coated on two sides in which case—contrary to what is shown in FIG. 2—they would be located between the tissue and the surface 31 and removably adhere to both of them.

Figure 3A:
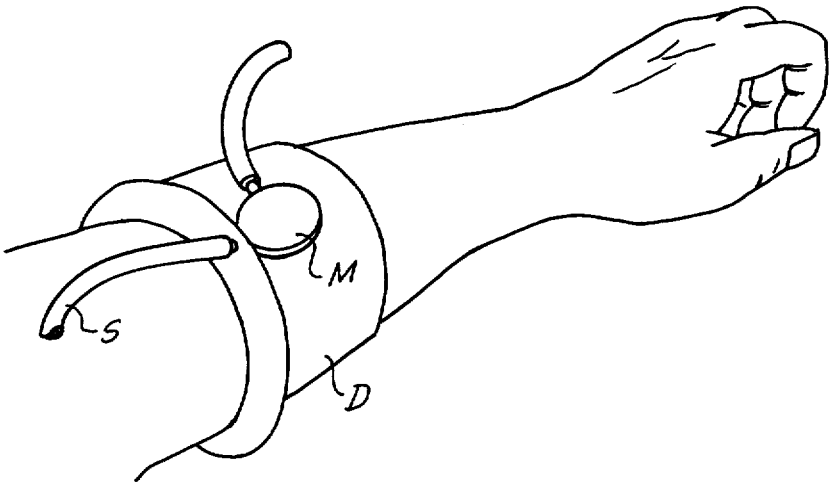
FIG. 3a shows the embodiment of FIG. 3 applied to an arm.
Figure 3:
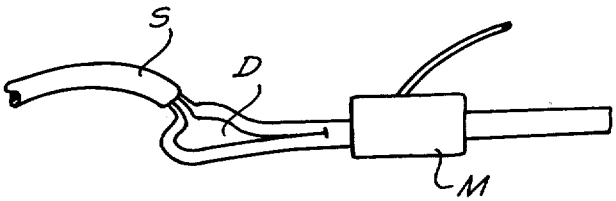
FIG. 3 is a perspective view illustrating a further embodiment of the invention.

FIGS. 3 and 3a show the unit M of FIG. 2 incorporated in an inflatable pressure-exerting cuff D which can for instance be placed around a human arm which is shown in FIG. 3a. Such cuffs are conventional and it will be understood that if air or another gas is admitted via the hose S into the cuff D, the latter will be inflated and exert pressure upon the arm, locally interrupting the flow of blood so that the extent of skin breathing can be determined by the time derivative of oxygen pressure, i.e. by the quotient $dPO_2/dt$, which is measured with the unit M. The hemoglobin content can be measured in this manner also. (R. Huch, structural thesis, Marburg 1971, p. 17).

Figure 4:
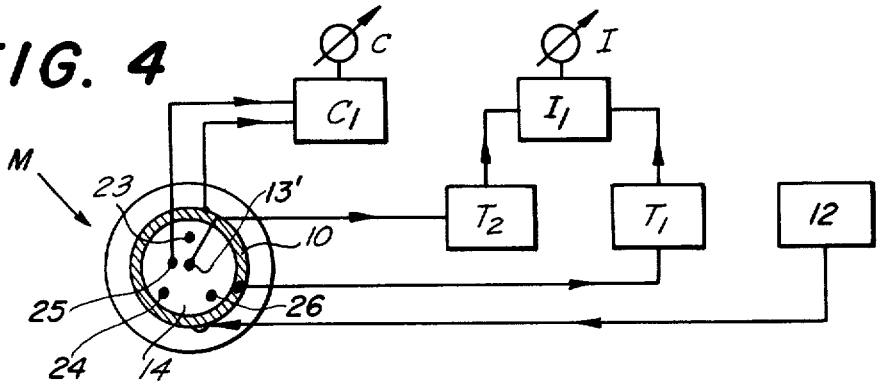
FIG. 4 is a circuit diagram, illustrating the connection of various components of an embodiment of the invention

Coming now to FIG. 4 is will be seen that this illustrates a circuit arrangement according to one embodiment of the invention. This arrangement has the advantage that the temperature $T_1$ of the first surface 10 which is heated by the heating device 12 at constant temperature, and the temperature $T_2$ of the second surface 13' (i.e., detected by the sensor 13), are both compared in the comparator 11 and utilized to form a differential signal I which is proportional to a function of the perfusion rate. At the same time, the signal C indicative of the indicator concentration, is obtained from the electrode indicator C1, for instance from a platinum electrode 25 of the unit M shown in FIG. 2.

If in certain instances the thermal flow values of the skin can be considered constant, then it is possible to use the "body core temperature" of the human being as a reference temperature. This makes it possible to measure only that amount of heat which must be supplied to maintain an area of the skin at a temperature higher than the skin temperature.

Figure 5:
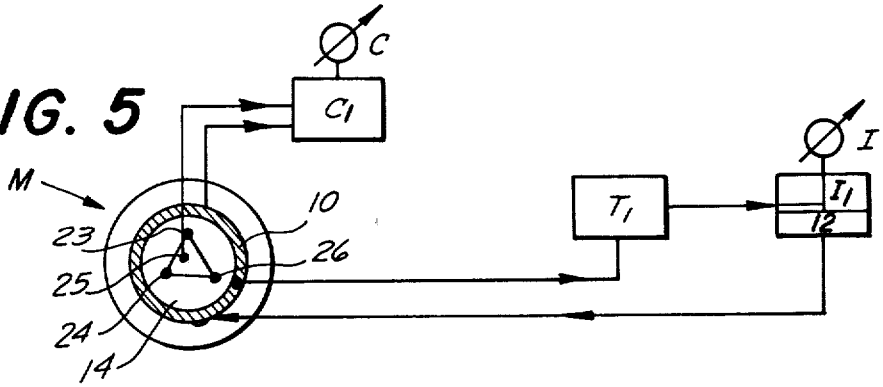
FIG. 5 is a view similar to FIG. 4, illustrating an additional arrangement.

For this reason it is advantageous if, as shown in FIG. 5, the surface 10 surrounds a measuring instrument 14 for the indicator concentration, so that the instrument 14 is centrally located within the area surrounded by the surface 10. The latter is heated via an electrical regulating device 12 well known in the art at a constant temperature $T_1$, and the amount of heat required to maintain the temperature of the surface 10 constant at a selected level is measured by a measuring instrument I1 which measures the differential signal I. The amount of heat required to maintain the temperature of the surface 10 constant is proportional to a function of the perfusion, if $T_1$ is above the body core temperature, the latter being monitored at the same time.

Figure 6:
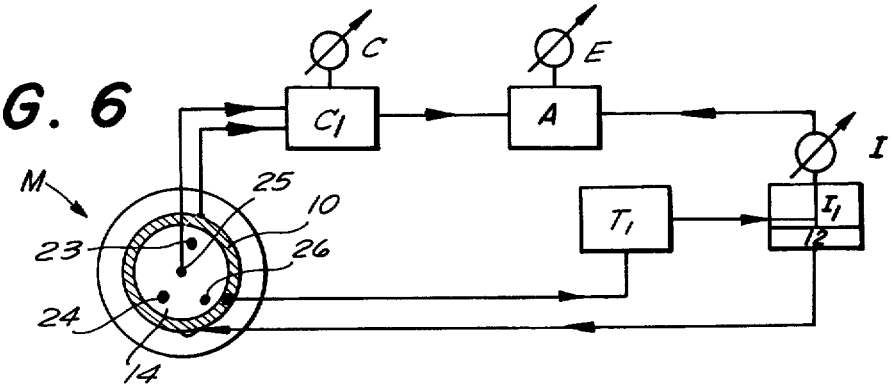
FIG. 6 is a view similar to FIG. 5, illustrating still a further arrangement.

FIG. 6, finally, shows that it is also advantageous if the signal I corresponding to the perfusion rate is combined electronically in combining means such as a functional amplfier A well known in the art with the signal C corresponding to the indicator concentration, to produce a resulting signal $$E=f(I,C).$$

This arrangement makes it possible to determine the perfusion efficiency factor E directly.

A further advantage is obtained if the temperature of the surface 10, that is the temperature $T_1$, can be varied between 37° and 42° F., either continuously or in steps. It has been found that during the prolonged hyperemia at 42° C. the hyperemia is maintained even after the skin is cooled to 37° C., the so-called excess hyperemia. This means that for instance the measurement of blood gases can be percutaneously carried out at body temperature. Since the physiological reactions take place without any influence upon them on the part of the measuring device if they are carried out at body core temperature, the danger of measuring errors is eliminated. The continuous measurement of the value I also provides for a control as to when the previously produced hyperemia reverses itself.

Just as in the case using a temperature differential between surfaces 10 and 13' for determining the perfusion rate, advantages are also obtained when the body core temperature is used as a reference temperature, and when the unit 14 is constructed as a multiple-wire platinum electrode for measuring the oxygen pressure, of the type described with reference to FIG. 2. For this purpose the embodiment of FIG. 5 would require that the member having the surface 10 be of chlorided silver (Ag/AgCl) and have a low heat capacity, surrounding the multiple-wire platinum electrode unit 14 in an annular manner and being electrically heatable via the regulating arrangement 12, with the heat being supplied being measured by the measuring instrument I1 which measures the differential signal. Four platinum electrode wires can be used, as already suggested in FIG. 2, and these platinum electrode wires can be so connected that the electrodes 23, 24 and 26 are connected in parallelism with one another because this permits a simple summation of the signals of the individual electrodes 23, 24 and 26. A further improvement can be obtained if the electrodes 23, 24 and 26 have a small or low response time, whereas the electrode 25 has a high response time for calibrating purposes, and if the electrodes 23, 24, 26 on the one hand, and the electrode 25 on the other hand can be sequentially connected with the instrument which measures the differential signal I, because this makes it possible to determine if and whether the device has been placed uniformly against the tissue to be measured, and also to control the calibration of the device.

The determination of the uniformity of application of the device against the tissue to be measured is described in the aforementioned copending application.

It will be understood that each of the elements described above, or two or more together, may also find a useful application in other types of constructions differing from the types described above.

While the invention has been illustrated and described as embodied in the percutaneous determination of the perfusion efficiency factor of animal tissue, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of determining the perfusion efficiency factor of animal tissue having blood vessels containing indicator substances therein, comprising the first step of percutaneously measuring the perfusion rate in animal tissue at a specific locus, said first step including heating a first member adapted to be placed against the tissue to be measured, measuring a first temperature of said first member, measuring a second temperature of a second member located centrally of said first member, comparing said first and second temperatures and forming a first differential signal which is proportional to the perfusion rate of the tissue; the second step of simultaneously percutaneously measuring the concentration of the indicator substances in the blood vessels in the tissue at the same locus and generating a second signal which is proportional to the concentration of the indicator substances in the blood vessels; and the third step of processing said first and second signals for generating a third signal which is indicative of the perfusion efficiency factor.

2. A method as defined in claim 1; and further comprising the subsequent steps of locally interrupting the circulation of blood through the tissue; and measuring the skin breathing factor by determining the time derivative of the oxygen pressure resulting from such interruption.

3. In a device for percutaneously measuring the perfusion efficiency factor of animal tissue having blood vessels containing indicator substances therein, a combination comprising a first member defining a first surface adapted to be placed against tissue to be measured; heating means for producing a controlled temperature in said first member at said first surface thereof; first sensor means for measuring a first temperature of said first surface; a second member defining a second surface surrounded by and located substantially centrally of said first surface; second sensor means for measuring a second temperature of the tissue at said second surface; comparator means for comparing said first and second temperatures and forming a first differential temperature signal which is proportional to the rate of perfusion of the tissues; concentration measuring means also surrounded by said first surface and operative for measuring the concentration of said indicator substances in the blood vessels in the tissue and generating a second signal which is proportional to the concentration of the indicator substances in the blood vessels; and combining means for simultaneously processing said first differential temperature signal and said second concentration signal at the same locus and generating a third signal indicative of the perfusion efficiency factor.

4. A combination as defined in claim 3; and further comprising an inflatable pressure-exerting cuff operative for effecting the interruption of blood circulation through the tissue; said members, said heating means, said sensor means, and said concentration measuring means being mounted in said cuff.

5. A combination as defined in claim 3, said concentration measuring means comprising a plurality of platinum electrodes having respective faces, an electrolyte in operative contact with said faces, and a gas-permeable membrane covering all of said faces; and wherein said first surface is annular and said first member means constitutes a counter-electrode for said platinum electrodes.

6. A combination as defined in claim 5, wherein said first member is at least at said first surface composed of Ag/AgCl and has a low thermal capacity; and wherein said heating means comprises electric heating means operative for producing at said first surface a constant temperature of selectable level.

7. A combination as defined in claim 6, wherein said concentration measuring means comprises four of said platinum electrodes, and wherein said platinum electrodes are connected in parallel with one another.

8. A combination as defined in claim 7, wherein three of said platinum electrodes have a small response time, and wherein one of said platinum electrodes has a large response time and serves as a calibrating electrode.

9. A combination as defined in claim 3, said first surface being annular and being formed with an annular groove; and further comprising connecting means for connecting said groove with a vacuum pump.

10. A combination as defined in claim 3; and further comprising adhesive means for removably connecting said device to the tissue being measured, with said first surface being adapted to contact said tissue.

11. A combination as defined in claim 3, wherein said heating means comprises electric heating means operative for producing at said first surface a constant temperature of selectable level.

12. A combination as defined in claim 3, wherein said heating means is regulatable for adjusting the temperature of said first surface to between 37° and 42° C.

13. A combination as defined in claim 3, wherein said tissue has a first temperature, and wherein said heating means is regulatable for adjusting the temperature of at least said first surface to a level higher than said first temperature.

*14. A method for determining the perfusion efficiency factor of animal tissue having blood vessels containing indicator substances therein, comprising:*

*the first step of percutaneously measuring the perfusion rate in animal tissue at a specific locus, said first step including heating a member adapted to be placed against the tissue to be measured to heat an area of skin to a constant temperature higher than skin tem-*

*perature and generating a first signal related to the amount of heat supplied, the amount of heat being proportional to the perfusion rate of the tissue;*

*the second step of simultaneously percutaneously measuring the concentration of the indicator substances in the blood vessels in the tissue at the same locus and generating a second signal which is proportional to the concentration of the indicator substances in the blood vessels; and*

*the third step of processing said first and second signals for generating a third signal which is indicative of the perfusion efficiency factor.*

*15. In a device for percutaneously measuring the perfusion efficiency factor of animal tissue having blood vessels containing an indicator substance therein, a combination comprising:*

*a member defining a surface adapted to be placed against tissue to be measured;*

*heating means for producing a constant temperature in said member at said surface;*

*means for measuring the heat supplied to keep said temperature constant, the heat being proportional to the rate of perfusion in the tissue, and for generating a signal proportional to said rate of perfusion;*

*concentration measuring means for measuring the concentration of said indicator substance in the blood vessels in the tissue and generating a second signal which is proportional to the concentration of the indicator substance in the blood vessels; and*

*combining means for simultaneously processing said first perfusion rate signal and said second concentration signal at the same locus and generating a third signal indicative of the perfusion efficiency factor.*

*16. A combination as defined in claim 15, wherein said concentration measuring means include a plurality of electrodes, an electrolyte in contact with said electrodes, and a gas permeable membrane covering said electrodes, and further wherein said member constitutes a counter-electrode for said electrodes.*

*17. A combination as defined in claim 16, wherein said heating means comprises electrical heating means for producing a constant temperature of selectable level at said surface.*

* * * * *